US012607883B2

(12) United States Patent
Loredo et al.

(10) Patent No.: US 12,607,883 B2
(45) Date of Patent: Apr. 21, 2026

(54) DEMULTIPLEXER AND METHOD OF USE THEREOF

(71) Applicants: TENCENT MOBILITY LIMITED, Wanchai (CN); TENCENT CLOUD EUROPE (GERMANY) GMBH, Frankfurt am (DE)

(72) Inventors: Juan Loredo, Wanchai (CN); Philip Walther, Wanchai (CN); Lena Hansen, Wanchai (CN)

(73) Assignees: TENCENT MOBILITY LIMITED, Wanchai (CN); TENCENT CLOUD EUROPE (GERMANY) GMBH, Frankfurt am (DE)

( * ) Notice: Subject to any disclaimer, the term of this patent is extended or adjusted under 35 U.S.C. 154(b) by 402 days.

(21) Appl. No.: 18/198,176

(22) Filed: May 16, 2023

(65) Prior Publication Data

US 2023/0296926 A1 Sep. 21, 2023

Related U.S. Application Data

(63) Continuation of application No. PCT/EP2022/057326, filed on Mar. 21, 2022.

(51) Int. Cl.
G02F 1/01 (2006.01)

(52) U.S. Cl.
CPC ........ G02F 1/0136 (2013.01); G02F 2201/34 (2013.01)

(58) Field of Classification Search
CPC . G02F 1/0136; G02F 2201/34; G02B 27/283; H04J 14/06; G06N 10/00; H04B 10/2581; H04B 10/6166
See application file for complete search history.

(56) References Cited

U.S. PATENT DOCUMENTS

| | | | |
|---|---|---|---|
| 6,389,045 B1 | 5/2002 | Mann et al. | |
| 7,400,658 B1 | 7/2008 | Spinelli et al. | |
| | (Continued) | | |

FOREIGN PATENT DOCUMENTS

| | | |
|---|---|---|
| CN | 105652476 A | 6/2016 |
| JP | 2002107683 A | 4/2002 |
| | (Continued) | |

OTHER PUBLICATIONS

Tencent Technology, ISR and Written Opinion, PCT/EP2022/057326, Oct. 31, 2022, 10 pgs.

(Continued)

*Primary Examiner* — Mariam Qureshi
(74) *Attorney, Agent, or Firm* — Morgan, Lewis & Bockius LLP

(57) ABSTRACT

An optical demultiplexer is provided, comprising: a first mirror and a second mirror; an electro-optic modulator arranged in an optical trajectory between the first and second mirrors; and a first polarizing beam-splitter arranged in the optical trajectory between the first mirror and the electro-optic modulator. The electro-optic modulator is configured to change, when in a first state, a polarization of light pulses passing through the electro-optic modulator; the light pulses travelling in the optical trajectory between the first mirror and the second mirror are displaced perpendicular to a propagation direction of the light pulses between the first mirror and the second mirror during each round of travelling forth and back between the first mirror and the second mirror; and the first polarizing beam-splitter is configured to reflect the light pulses which are displaced with respect to each other perpendicular to the propagation direction onto different, respective output trajectories.

19 Claims, 10 Drawing Sheets

(56) References Cited

U.S. PATENT DOCUMENTS

| | | | |
|---|---|---|---|
| 2019/0235170 A1* | 8/2019 | Mao | G02B 6/29311 |
| 2021/0389244 A1* | 12/2021 | Bowman | G01S 17/894 |

FOREIGN PATENT DOCUMENTS

| | | | |
|---|---|---|---|
| JP | 2003503750 A | 1/2003 |
| JP | 2003051635 A | 2/2003 |
| JP | 2005064871 A | 3/2005 |
| JP | 2007094017 A | 4/2007 |
| JP | 2008180760 A | 8/2008 |
| JP | 2013084971 A | 5/2013 |
| JP | 2014530380 A | 11/2014 |
| JP | 2017525144 A | 8/2017 |
| JP | 2019520720 A | 7/2019 |
| JP | 2022513090 A | 2/2022 |
| WO | WO 2018068038 A1 | 4/2018 |
| WO | WO 2020106972 A1 | 5/2020 |
| WO | WO 2021010089 A1 | 1/2021 |
| WO | WO 2021185967 A2 | 9/2021 |

OTHER PUBLICATIONS

Tencent Technology, Japanese Office Action, JP Patent Application No. 2023-548832, Aug. 22, 2024, 12 pgs.
Tencent Technology, Korean Office Action, KR Patent Application No. 10-2023-7017233, Nov. 21, 2024, 16 pgs.

* cited by examiner 200, 300

402

400

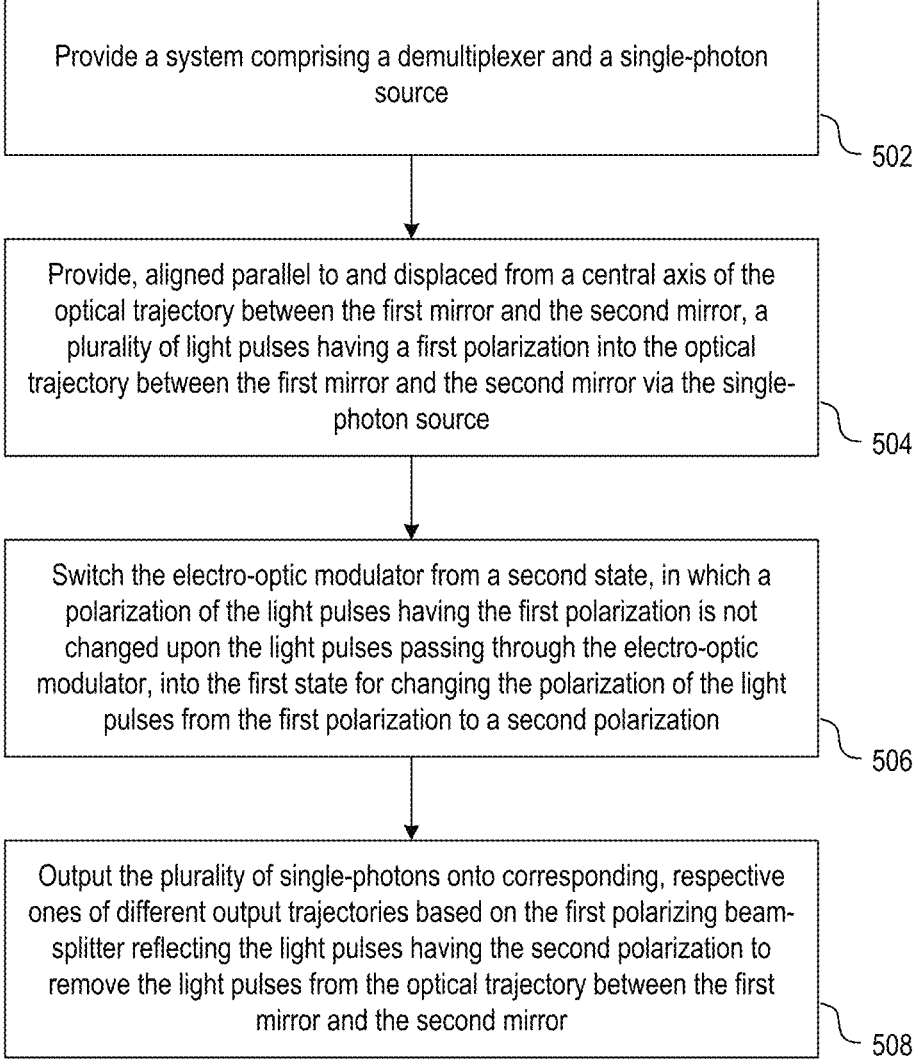

Provide a system comprising a demultiplexer and a single-photon source

502

Provide, aligned parallel to and displaced from a central axis of the optical trajectory between the first mirror and the second mirror, a plurality of light pulses having a first polarization into the optical trajectory between the first mirror and the second mirror via the single-photon source

504

Switch the electro-optic modulator from a second state, in which a polarization of the light pulses having the first polarization is not changed upon the light pulses passing through the electro-optic modulator, into the first state for changing the polarization of the light pulses from the first polarization to a second polarization

506

Output the plurality of single-photons onto corresponding, respective ones of different output trajectories based on the first polarizing beam-splitter reflecting the light pulses having the second polarization to remove the light pulses from the optical trajectory between the first mirror and the second mirror

Provide a demultiplexer/system

602

Perform a quantum computing operation based on on (i) light pulses output onto different output trajectories using the optical demultiplexer, or (ii) a plurality of single-photons output onto corresponding, respective ones of different output trajectories

604

600

DEMULTIPLEXER AND METHOD OF USE THEREOF

CROSS-REFERENCE TO RELATED APPLICATIONS

This application is a continuation application of PCT Patent Application No. PCT/EP2022/057326, entitled "DEMULTIPLEXER AND METHOD OF USE THEREOF" filed on Mar. 21, 2022, which is incorporated by reference in its entirety.

TECHNICAL FIELD

This invention generally relates to a demultiplexer, which in particular employs one single active element to route an arbitrary number of temporal modes of the same spatial mode towards different synchronized spatial modes.

BACKGROUND

Generally, in photonics, that is for both classical and quantum regimes, various properties of light, such as, but not limited to the polarization, and the temporal and spatial information of light are manipulated. In view of photonics platforms being more and more complex, consequentially the number of modes which may need to be manipulated simultaneously increases. In some approaches according to the state of the art, when aiming to generate multiple simultaneous modes, one may start with a single spatial mode which contains a stream of light pulses which is time-to-space demultiplexed. This results in (non-simultaneous) pulses which are routed onto different spatial modes which are synchronized (simultaneous).

A demultiplexing protocol may be used in photonic (optical) quantum computation, in which a demultiplexed signal is generated from multi-photon sources, and the demultiplexed signal may be used to process quantum information allowing for quantum computation.

FIG. 1 shows a demultiplexer approach according to the state of the art. In this example, in the demultiplexer 100, light stemming from a single-photon source (that is a stream of individual particles of light travelling all through the same spatial mode, such as, for example, an optical fiber) first passes through an active element, in this example a Pockels cell 102, so that the polarization of the photons is alternated between two orthogonal polarization states. Subsequently, the photons pass through a polarizing beam-splitter 104 which sorts the photons according to their polarization. This results in two spatial modes of single-photons. This process may be repeated in the network of Pockels cells (e.g. Pockels cells 106, 110) and polarizing beam-splitters (e.g. polarizing beam-splitters 108, 112), whereby the different photons with different polarizations may be reflected by mirrors (e.g. mirror 114) towards different output paths.

In this example, laser pulses occurring, for example, every 12.5 ns pass through the series of electro-optic modulators (in this example Pockels cells) and polarizing beam-splitters, to be actively routed onto different spatial outputs.

An optical delay is applied to one or more outputs to correct for their temporal mismatch. Temporal delays may, for example, be implemented via fibers applied at the output to correct and match the time of arrival of the different photons.

With the approach shown in FIG. 1, a single-photon source is demultiplexed, in the first stage of Pockels cell 102 and polarizing beam-splitter 104, into a synchronized two-photon source. As in the example of FIG. 1, the above process may be repeated at each newly created spatial mode in order to add every time one more active element to create one more output spatial mode, thereby resulting in a demultiplexed multi-photon source.

The number of required active elements equals, in this example, the number of target output modes minus one.

Demultiplexed photon modes may, based on sources of up to, for example, 10 to 20 photon modes, be used in photonic quantum computing experiments. The generation of these photon modes may be experimentally cumbersome, since many active elements are needed which may occupy considerable space in a laboratory, and every active element generally requires expensive high-voltage pulses with challenging synchronization.

There is therefore a need for improved demultiplexers.

SUMMARY

According to the present disclosure, there is provided an optical demultiplexer. The optical demultiplexer comprises an electro-optic modulator configured to change, when the electro-optic modulator is in a first state, a polarization of light pulses having a first polarization and passing through the electro-optic modulator from the first polarization to a second polarization. The polarization of light pulses may hereby refer to the polarization state of the light pulses, and when the polarization state of the light pulses relates to the light pulses having the first polarization, the electro-optic modular is configured to change the polarization state of the light pulses so that the light pulses have the second polarization when exiting the electro-optic modulator. The optical demultiplexer further comprises a first mirror and a second mirror, wherein the electro-optic modulator is arranged in an optical trajectory between the first mirror and the second mirror for light pulses travelling in the optical trajectory between the first mirror and the second mirror to pass through the electro-optic modulator, wherein the first mirror and the second mirror are arranged in the optical demultiplexer such that the light pulses travelling in the optical trajectory between the first mirror and the second mirror are displaced perpendicular to a propagation direction of the light pulses between the first mirror and the second mirror during each round of travelling forth and back between the first mirror and the second mirror. The optical demultiplexer further comprises a first polarizing beam-splitter arranged in the optical trajectory between the first mirror and the electro-optic modulator, wherein the first polarizing beam-splitter is configured to: transmit light pulses having the first polarization, and reflect light pulses having the second polarization to remove the light pulses having the second polarization from the optical trajectory between the first mirror and the second mirror, wherein the first polarizing beam-splitter is configured to reflect the light pulses which are displaced with respect to each other perpendicular to the propagation direction onto different, respective output trajectories. Whether light pulses have the first polarization such that the first polarizing beam-splitter transmits such light pulses, or whether light pulses have the second polarization such that the first polarizing beam-splitter reflects such light pulses, can be controlled by controlling the state of the electro-optic modulator. In some examples, the electro-optic modulator is turned on when it is in the first state, so that the polarization state of the light pulses having the first polarization is changed to the second polarization when the light pulses travel through the electro-optic modulator.

The optical demultiplexer as described herein may allow for reducing the technical load needed in order to produce a working demultiplexed multi-photon source. Multiple high-voltage electric pulse generators are no longer needed, and thus costs as well as space required to prepare the multi-photon source are reduced.

The electro-optic modulator may switch the polarization of light pulses, and once switched, the beam-splitter may reflect the light pulses to remove the light pulses from the optical trajectory between the first mirror and the second mirror.

Once light pulses are displaced with respect to each other perpendicular to the propagation direction between the mirrors, they may be reflected by the beam-splitter onto different, respective output trajectories.

It is to be noted that light pulses may be displaced with respect to each other in view of light pulses being generated with time intervals between them and thus "displaced" with respect to each other. Such light pulses would end up on the same output trajectory (potentially at different times) if they are not displaced with respect to each other perpendicular to the propagation direction between the mirrors.

In some examples, an electro-optic modular may be a modulator that utilizes the electro-optical effects of certain electro-optical crystals, such as, but not limited to lithium niobium acid crystals (LiNbO3), arsenide crop crystals (GaAs) and lithium tantalum acid crystals (LiTaO3). The electro-optical effect is when the voltage is applied to the electro-optical crystal, the refractive index of the electro-optical crystal changes, resulting in the change of the photoportability of the crystal, and a modulation of the phase, amplitude, intensity and polarization state of the optical signal may be realized.

In some examples, a polarizing beam-splitter, such as, but not limited to the Wollaston prism, may use a birefringent material to split light into two beams of orthogonal polarization states. A birefringent material may be a relatively simple and cheap way for splitting light into (e.g. S-polarized) reflected and (e.g. P-polarized) transmitted light beams.

In some implementations, the demultiplexer further comprises a second polarizing beam-splitter arranged in the optical trajectory between the second mirror and the electro-optic modulator, wherein the second polarizing beam-splitter is configured to: transmit light pulses having the first polarization, and reflect light pulses having the second polarization to remove the light pulses having the second polarization (based on the electro-optic modulator having switched the polarization of the light pulses from the first polarization to the second polarization) from the optical trajectory between the first mirror and the second mirror, wherein the second polarizing beam-splitter is configured to reflect the light pulses which are displaced with respect to each other perpendicular to the propagation direction onto different, respective output trajectories. Providing a second polarizing beam-splitter as outlined above may be particularly advantageous since the number of output beams may be increased (in some examples doubled).

In some implementations, the demultiplexer further comprises a first converging lens arranged in the optical trajectory between the electro-optic modulator and the first polarizing beam-splitter, wherein the first converging lens is configured to converge light pulses travelling in the optical trajectory from the electro-optic modulator to the first converging lens for the light pulses which are displaced with respect to each other perpendicular to the propagation direction to travel parallel with respect to each other between the first converging lens and the first polarizing beam-splitter. This may allow for light pulses which are removed from the optical trajectory between the first mirror and the second mirror to travel parallel once reflected onto the different, respective output trajectories, which may simplify the further use of the light pulses (e.g. if an exact timing of when the respective light pulses are reflected onto the respective output trajectories is required).

In some implementations, the demultiplexer further comprises a second converging lens arranged in the optical trajectory between the electro-optic modulator and the second mirror, wherein the second converging lens is configured to converge light pulses travelling in the optical trajectory from the electro-optic modulator to the second converging lens for the light pulses which are displaced with respect to each other perpendicular to the propagation direction to travel parallel with respect to each other between the second converging lens and the second mirror. This may allow for light pulses which are removed from the optical trajectory between the first mirror and the second mirror to travel parallel once reflected onto the different, respective output trajectories, which may simplify the further use of the light pulses (e.g. if an exact timing of when the respective light pulses are reflected onto the respective output trajectories is required).

In some implementations, the second converging lens is arranged in the optical trajectory between the electro-optic modulator and the second polarizing beam-splitter, wherein the second converging lens is configured to converge light pulses travelling in the optical trajectory from the electro-optic modulator to the second converging lens for the light pulses which are displaced with respect to each other perpendicular to the propagation direction to travel parallel with respect to each other between the second converging lens and the second polarizing beam-splitter. This may allow for light pulses which are removed from the optical trajectory between the first mirror and the second mirror to travel parallel once reflected onto the different, respective output trajectories, which may simplify the further use of the light pulses (e.g. if an exact timing of when the respective light pulses are reflected onto the respective output trajectories is required).

In some implementations, the first converging lens and the second converging lens are arranged in the optical demultiplexer in a telescope configuration with unit magnification. This may allow for providing a more confined optical demultiplexer, thereby reducing further the space required to prepare the multi-photon source.

In some implementations, an input path into the optical demultiplexer for light pulses travelling in the optical trajectory between the first mirror and the second mirror is aligned parallel to and displaced from a central axis of the telescope configuration. This is a simple way of providing a light beam into the optical demultiplexer in which the light beam is then displaced perpendicular to its propagation direction when travelling forth and back between the two mirrors.

In some implementations, the electro-optic modulator is arranged in a center or center region of the telescope configuration. This allows for the light beam polarization to be switched for all light beams travelling forth and back between the two mirrors, while the electro-optic modulator can be confined to a (small) space in the center or center region of the telescope configuration.

In some implementations, the first mirror comprises a first mirror component and a second mirror component for reflecting light pulses travelling in the optical trajectory from the first converging lens to the first mirror, wherein the first mirror component and the second mirror component are aligned perpendicular or substantially perpendicular with respect to each other, and wherein the first mirror component and the second mirror component are aligned at an angle of 45 degrees or substantially 45 degrees with respect to the optical trajectory on which the light pulses travel parallel with respect to each other between the first converging lens and the first mirror. This allows for a simple and cost-effective way of ensuring that the light beam is displaced in a direction perpendicular to the propagation direction between the two mirrors to ultimately reflect, by the beam splitter, the light beams onto different, respective output trajectories.

In some implementations, the second mirror comprises a third mirror component and a fourth mirror component for reflecting light pulses travelling in the optical trajectory from the second converging lens to the second mirror, wherein the third mirror component and the fourth mirror component are aligned perpendicular or substantially perpendicular with respect to each other, and wherein the third mirror component and the fourth mirror component are aligned at an angle of 45 degrees or substantially 45 degrees with respect to the optical trajectory on which the light pulses travel parallel with respect to each other between the second converging lens and the second mirror. This allows further for a simple and cost-effective way of ensuring that the light beam is displaced in a direction perpendicular to the propagation direction between the two mirrors to ultimately reflect, by the beam splitter, the light beams onto different, respective output trajectories.

In some implementations, one or both of the first mirror and the second mirror comprise an opening for light pulses to be provided into the optical trajectory between the first mirror and the second mirror. This may be provided in any one or more of the example implementations outlined throughout the present disclosure, and may allow for a simple and cost-effective way of providing light beams into the optical demultiplexer in a desired way.

In some implementations, the demultiplexer further comprises a third mirror arranged at an end of the optical trajectory at normal incidence with respect to the optical trajectory at an end portion of the optical trajectory for reflecting light pulses to travel in the opposite direction between the first mirror and the second mirror. This may be particularly advantageous since the number of light pulses to be output onto different, respective output trajectories may be doubled.

In some implementations, the optical demultiplexer is configured to remove, via the first polarizing beam-splitter, light pulses having different temporal modes and a same spatial mode from the optical trajectory onto different spatial modes when switching the electro-optic modulator from a second state, in which the polarization of the light pulses having the first polarization is not changed upon the light pulses passing through the electro-optic modulator, into the first state, thereby allowing for further use of the light pulses with originally different temporal modes and a same spatial mode independently from each other. This may be provided in any one or more of the example implementations outlined throughout the present disclosure.

In some implementations, based on all light pulses travelling on the optical trajectory between the first mirror and the second mirror having the first polarization and upon the electro-optic modulator being switched from the second state into the first state for the polarization of all light pulses being changed from the first polarization to the second polarization when travelling through the electro-optic modulator in the first state, the first polarizing beam-splitter is configured to remove all light pulses simultaneously or within less than 10 nanoseconds from the optical trajectory between the first mirror and the second mirror. This may ensure that the switching time of the modulation is less than the standard 12.5 ns in 80 MHz repetition rate systems. This may be provided in any one or more of the example implementations outlined throughout the present disclosure.

In some implementations, upon the electro-optic modulator being switched from the second state into the first state, the first polarizing beam-splitter is configured to remove all light pulses simultaneously or within less than 10 nanoseconds from the optical trajectory between the first mirror and the second mirror and to reflect all light pulses onto the different, respective output trajectories with each one of said output trajectories containing a single one of said light pulses. This may ensure that the switching time of the modulation is less than the standard 12.5 ns in 80 MHz repetition rate systems. This may be provided in any one or more of the example implementations outlined throughout the present disclosure.

In some implementations, the electro-optic modulator comprises a Pockels cell, and wherein the first state relates to a state in which the Pockels cell is turned on. A Pockels cell may be particularly advantageous as it allows for ultra-fast and precise light modulation. A Pockels cell may be defined as an electro-optical modulation device which exploits the Pockels effect. The Pockels effect refers to a photoelectric phenomenon in which the refractive index of a particular crystal is proportional to the strength of the electric field. Through the control of the external electric field, the refractive index of a certain direction is changed, so that the Pockels cell can work as a variable half-wave chip, thus realizing the polarization state change.

In some implementations, the electro-optic modulator is switchable between the first state, in which the polarization of the light pulses having the first polarization is changed upon the light pulses passing through the electro-optic modulator, and a second state, in which the polarization of the light pulses having the first polarization is not changed upon the light pulses passing through the electro-optic modulator, in less than 10 nanoseconds. This may ensure that the switching time of the modulation is less than the standard 12.5 ns in 80 MHz repetition rate systems. This may be provided in any one or more of the example implementations outlined throughout the present disclosure.

In some implementations, the demultiplexer further comprises a set of further mirrors arranged in the optical trajectory to confine the optical trajectory in an area having dimensions of 1.5 meters or less by 0.5 meters or less for an optical trajectory length of at least 6 meters. The space required for the optical demultiplexer may hereby be further reduced, resulting in particular in cost-savings.

There is further provided a quantum computing system comprising the optical demultiplexer of any one of the implementations described herein and in particular above.

There is further provided a system, in particular a quantum computing system, comprising: the optical demultiplexer of any one of the implementations described herein and in particular above; a single-photon source for generating a stream of single-photons, wherein the single-photon source is coupled to the optical demultiplexer for providing, by the single-photon source to the optical demultiplexer, the stream of single-photons, and wherein the optical demultiplexer is configured to output a plurality of indistinguishable single-photons onto corresponding, respective ones of the different output trajectories. Indistinguishable single-photons may hereby be generated without the use of multiple high-voltage electric pulse generators, thereby reducing costs and space required to prepare the multi-photon source.

There is further provided a method of outputting a plurality of single-photons onto corresponding, respective ones of different output trajectories, wherein the method comprises: providing the system of any one of the implementations described herein and in particular above; providing, aligned parallel to and displaced from a central axis of the optical trajectory between the first mirror and the second mirror, a plurality of light pulses having a first polarization into the optical trajectory between the first mirror and the second mirror via the single-photon source, switching the electro-optic modulator from a second state, in which a polarization of the light pulses having the first polarization is not changed upon the light pulses passing through the electro-optic modulator, into the first state for changing the polarization of the light pulses from the first polarization to a second polarization; and outputting the plurality of single-photons onto corresponding, respective ones of different output trajectories based on the first polarizing beam-splitter reflecting the light pulses having the second polarization to remove the light pulses from the optical trajectory between the first mirror and the second mirror. As outlined above, light pulses may be generated without the use of multiple high-voltage electric pulse generators, thereby reducing costs and space required to prepare the multi-photon source.

In some implementations, one or more of the light pulses travel forth and back between the first mirror and the second mirror multiple times, and wherein the electro-optic modulator is switched from the second state into the first state while one of the light pulses travels on its last round of travelling forth and back between the first mirror and the second mirror. This may allow for a predefined number of light pulses to be output onto the different, respective output trajectories. Additionally or alternatively, a beam transverse spatial width of the light pulses provided via the single-photon source is 2 millimeters or approximately 2 millimeters (in relation to a 1/e intensity), which may allow for maintaining a Rayleigh range of several meters (which may, in some examples, be important as the typical separation between light pulses is approximately 12.5 ns, i.e. approximately 4 m in a fixed time frame).

There is further provided a method for performing quantum computing based on (i) light pulses reflected/output onto different output trajectories using the optical demultiplexer or quantum computing system of any one of the example implementations as described herein and in particular above, or (ii) a plurality of single-photons output onto corresponding, respective ones of different output trajectories using the system of any one of the example implementations as described herein and in particular above.

There is further provided a computer program product comprising program code portions for performing the method outlined above when the computer program product is executed on one or more computing devices. In some preferred examples, the computer program product is stored on a computer-readable recording medium.

Based on the example implementations as described herein, the issue of scalability in time-space demultiplexers is solved. A near-recurrent geometry may be used for the path of the input single-photon source in order to demultiplex the input source to an arbitrary number of output modes using only one active element. By construction, the resulting demultiplexed modes are synchronized such that no further optical delays are required.

Throughout the present disclosure, an active (optical) element may refer to an electronic component that changes the motion properties of photons (e.g. polarization, amplitude, etc.) by electrical energy. In some examples, an active element is, e.g., an electro-optical modulator, such as an electro-optical modulation Pockels cell.

Using examples implementations as described herein, the technical load needed to produce a working demultiplexed multi-photon source is reduced. The challenging handling of many high-voltage electric pulse generators is overcome. As a result, implementations as described herein allow for reducing costs and at the same time reducing volume and space required within a laboratory.

BRIEF DESCRIPTION OF THE DRAWINGS

These and other aspects of the invention will now be further described, by way of example only, with reference to the accompanying figures, wherein like reference numerals refer to like parts, and in which:

FIG. 5 shows a flow chart of a method according to some example implementations of the present disclosure.

DETAILED DESCRIPTION

The present disclosure generally relates to a resource-efficient active time-space demultiplexer.

A demultiplexer module is presented which requires, according to some implementations, only a single active element in order to route an arbitrary number of temporal modes of the same spatial mode towards different synchronized spatial modes. A stream of light pulses travelling in the same spatial trajectory may be transformed into multiple trajectories each simultaneously containing a single pulse.

According to some example implementations of the present disclosure, the demultiplexer is generally built using mainly three kinds of optical elements: one or more polarizing beam-splitters (PBSs), highly-reflective mirrors, and one ultra-fast electro-optic modulator (e.g. Pockels cell) with a switching rate of, for example, more than 10 MHz.

When using the demultiplexer according to example implementations as described herein, the demultiplexer may be operated in a "loading" stage and a "release" stage. In the "loading" stage, the demultiplexer module is used for the input path of the photon source to traverse an increasingly growing near-recurrent geometry as long as the electro-optic modulator is kept in its OFF state. In the "release" stage, the electro-optic modulator is switched to its ON state, which results in the flipping of the polarization of all light pulses travelling through the electro-optic modulator, thereby allowing for each pulse to simultaneously take upon a different output trajectory.

The number of active elements needed in the time-space demultiplexer according to some example implementations of the present disclosure in order to demultiplex N pulses has been reduced from N, as in existing alternatives, down to only one active element, generally irrespective of N. N may hereby denote the number of pulses to be multiplexed which, according to some example implementations of the present disclosure, may only depend on the size of the optics used. As a result, the number of generally relatively expensive high-voltage amplifiers is reduced, fewer birefringent crystals may need to be exploited, and complex electronics for multi-pulse synchronization may be avoided in example implementations according to the present disclosure.

FIGS. 2a to d show schematic illustrations of a demultiplexer 200 according to some example implementations of the present disclosure.

Figure 1:
FIG. 1 shows a schematic illustration of a demultiplexer according to the state of the art.
Figure 2A:
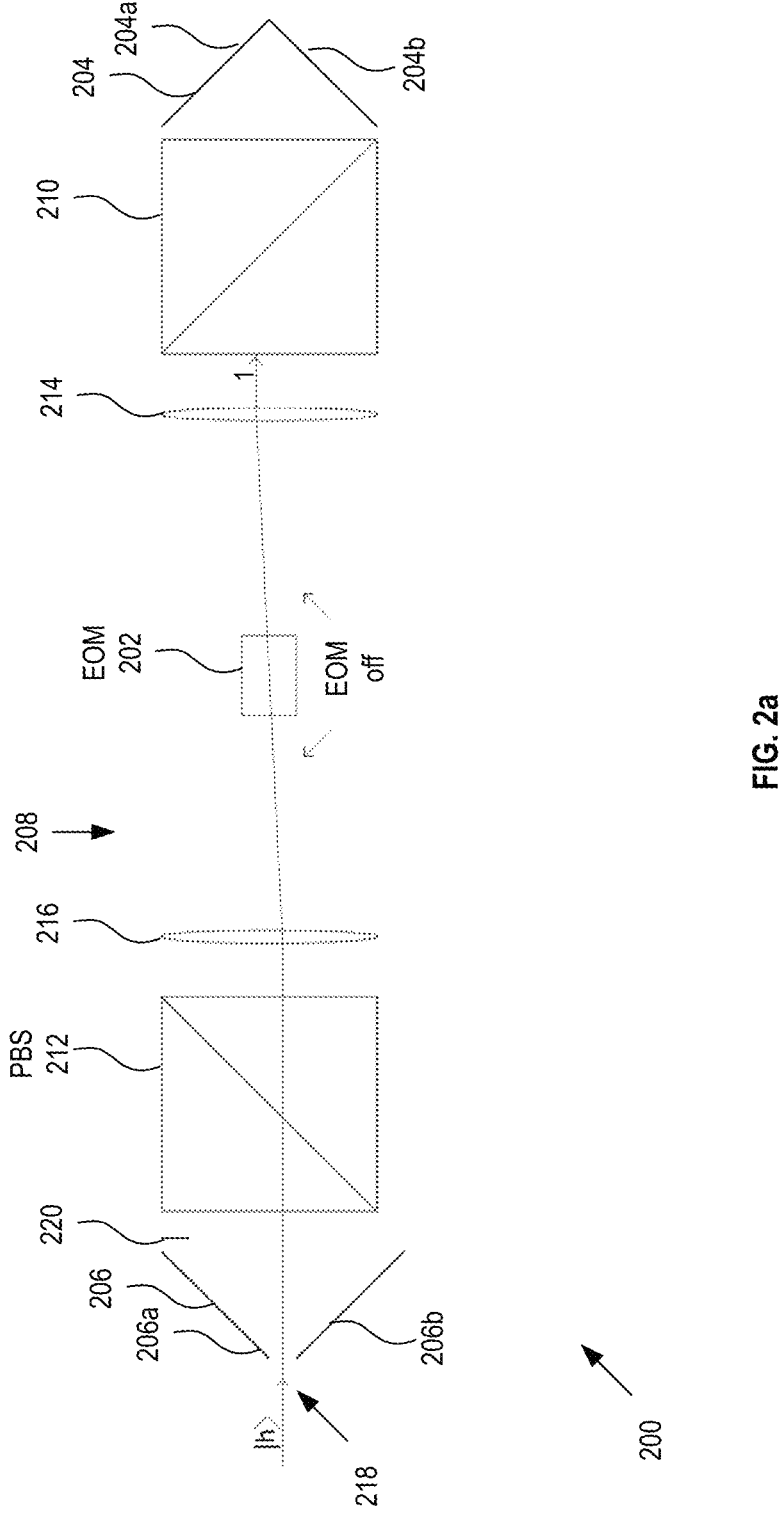
FIGS. 2a to d show schematic illustrations of a demultiplexer according to some example implementations of the present disclosure.

In this example, as can be seen in FIG. 2a, the demultiplexer 200 generally comprises an electro-optic modulator (EOM) 202, a first mirror 204 and a second mirror 206. In this example, the first mirror 204 comprises a first mirror component 204a and a second mirror component 204b. Furthermore, in this example, the second mirror 206 comprises a third mirror component 206a and a fourth mirror component 206b.

In order to ultimately couple light out of the optical trajectory 208 between the first mirror 204 and the second mirror 206, a first polarizing beam-splitter 210 and a second polarizing beam-splitter 212 are provided. As will be appreciated, however, a single polarizing beam-splitter may be sufficient in order to couple light out of the optical trajectory 208 between the first mirror 204 and the second mirror 206.

In this example, a first converging lens 214 is arranged in the optical trajectory between the electro-optic modulator 202 and the first poll beam-splitter 210, and a second converging lens 216 is arranged in the optical trajectory between the electro-optic modulator 202 and the second polarizing beam-splitter 212.

In this example, the input path 218 for the light source (photons denoted using Dirac notation, |h>) into the demultiplexer 200 is aligned parallel-displaced from a central axis of the telescope configuration formed by the first converging lens 214 and the second converging lens 216, which are, in this example, identical lenses, wherein the telescope configuration exhibits unit magnification. This slightly parallel-displaced alignment of the input path 218 with respect to the central axis of the telescope configuration with unit magnification results in the displacement being mirrored in its opposite direction at the output of the telescope. This results in a near-recurrent geometry for the input beam trajectory.

The center (or center region) of the telescope contains, in this example, the active electro-optic modulator 202 (in some examples a Pockels cell) and the telescope itself is placed within polarizing beam-splitters 210 and 212.

In this example, a mirror 220 is arranged at an end of the optical trajectory to return all beams once again in the backwards travelling direction in order to double the number of output modes, as will be described further below.

According to the arrangement as shown in FIG. 2a, in a first step of the demultiplexer approach according to the present disclosure, in some examples, e.g. horizontally-polarized light pulses may traverse the polarizing beam-splitter 212, the telescope made of the two converging lenses 214 and 216, and the electro-optic modulator 202.

Figure 2B:
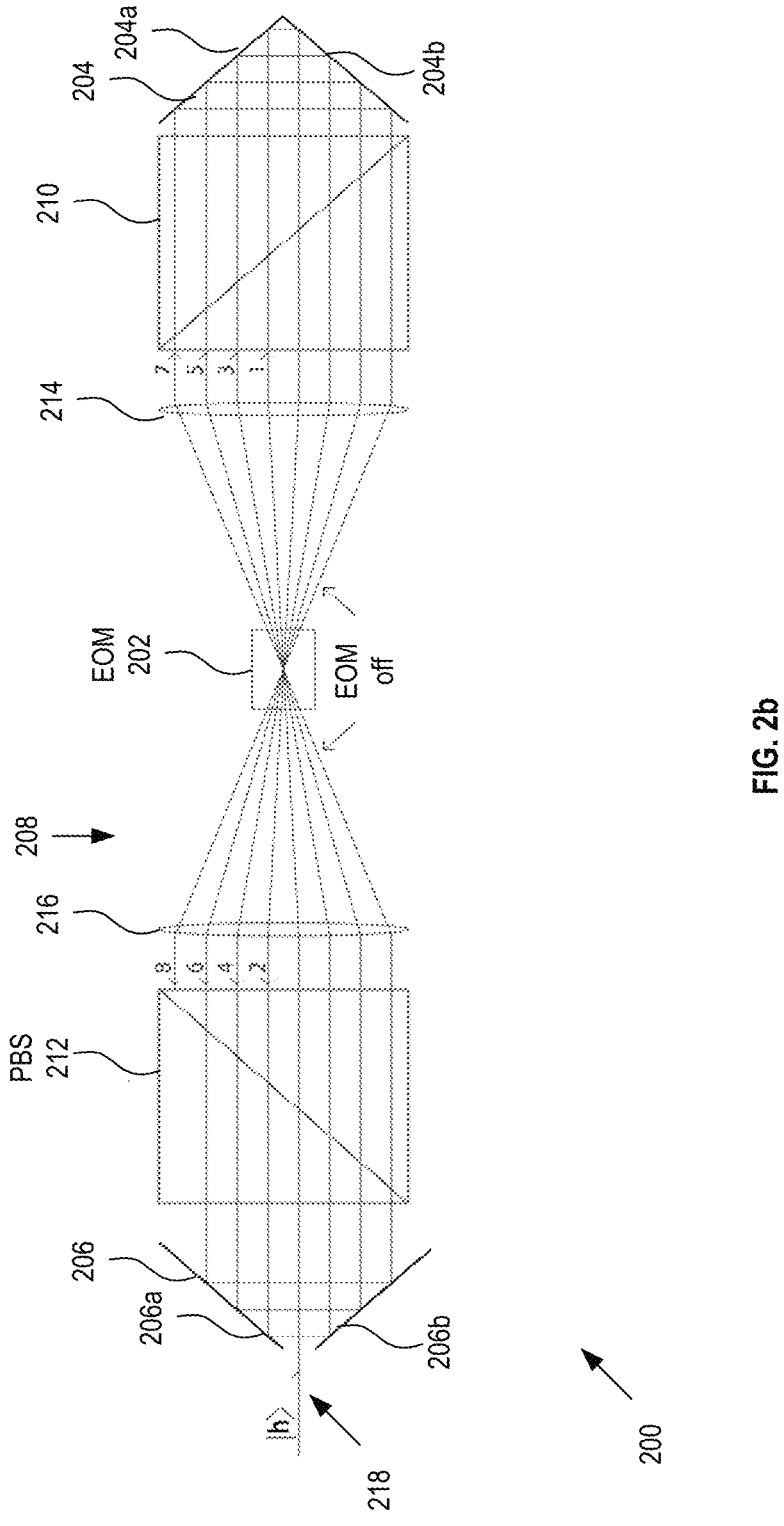

As shown in FIG. 2b, the mirrors 204 and 206 with their respective components are used in order to align the beam trajectory so that after traversing through the polarizing beam-splitters, converging lenses and electro-optic modulator, as long as the electro-optic modulator is kept off, light returns back into the setup in a parallel-displaced trajectory, but now travelling in opposite directions (paths 2, 4, 6 and 8 shown in FIG. 2b). This process continues repeating itself multiple times while the electro-optic modulator is kept off as long as the clear aperture of the optical elements allows it. The optical trajectory thus continues building up with a near-recurrent geometry and the light polarization is maintained, in this example, horizontal.

As was already shown in relation to FIG. 2a, a mirror 220 is placed, in this example, at normal incidence at the end of the optical trajectory so that all beams are returned once again in the backwards travelling direction. The number of output modes is therefore doubled (in this example 16 modes) for the same clear aperture size, as can be seen in FIG. 2c.

Figure 2C:
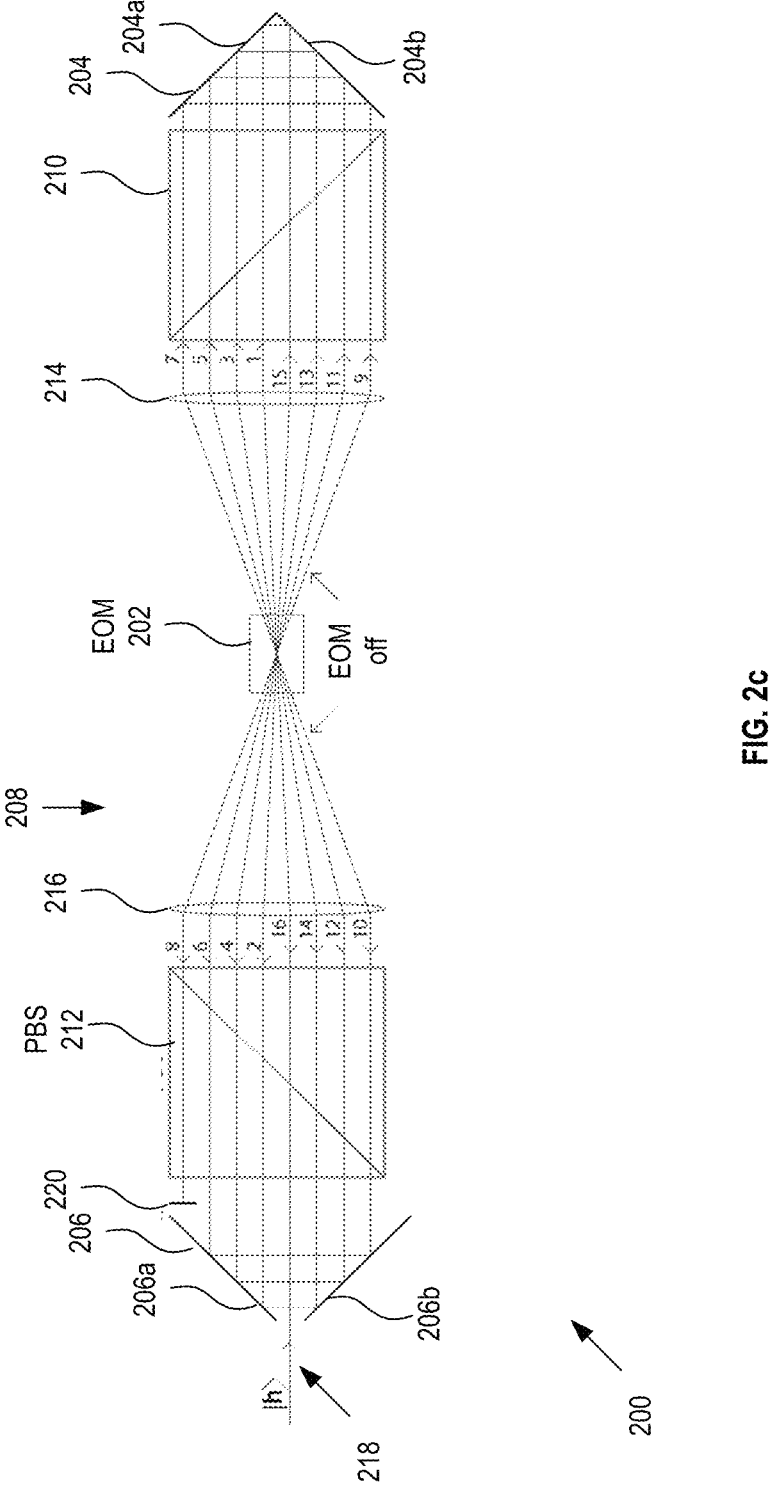

The procedure shown in FIGS. 2a to 2c completes the "loading" stage of light pulses to be demultiplexed of some protocols according to the present disclosure.

In the "releasing" stage of this protocol, the electro-optic modulator 202 is turned on, so that the polarization of light pulses are rotated, in this example, to its vertical direction. As a result, in this example, the polarizing beam-splitters 210 and 212 reflect the light pulses so that the light pulses are released from the original optical trajectory, thereby completing the demultiplexed protocol (see FIG. 2d). All initial temporal delays between the input light pulses are erased by the setup geometry itself so that all light pulses are left synchronized. The light pulses are thus released onto different (synchronized) output trajectories, resulting in the demultiplexed signal.

If the input light consists of a stream of single-photons, the demultiplexer allows for preparing a source of multiple indistinguishable single-photons e.g. ready to be plugged into and interfered in multimode interferometers for protocols within photonic quantum computing. An important application of the demultiplexer is thus the building of multi-photon sources for optical quantum information processing, although other applications are possible, as will be appreciated by those with skill in the art.

Relevant parameters to consider for technical aspects of the demultiplexer are optical losses, the passive and active polarization contrasts, the beam trajectory spatial width, clear apertures, and the electro-optic modulator (Pockels cell) rise time.

In some examples of the demultiplexer, the mirrors exhibit a reflectivity of more than 99.99% (that is less than 0.01% loss per element). Additionally or alternatively, the polarizing beam-splitters exhibit less than 1% loss per element. Additionally or alternatively, the converging lenses have less than 1% loss per element. Additionally or alternatively, the electro-optic modulator has less than 1% loss per element.

In some examples, the polarization contrast—ratio between s-polarized and p-polarized light transmission (reflection)—of the polarizing beam-splitter(s) is larger than 1000:1, for both the transmitted and reflected ports. Furthermore, in some examples, the electro-optic modulator can reach an active polarization contrast of more than 100:1.

In some examples, the beam transverse spatial width can vary, and may be chosen, in some examples, to be approximately 2 mm diameter (relating to a 1/e intensity), to thereby maintain a Rayleigh range of several meters. This may be important, as the typical separation between light pulses is approximately 12.5 ns, i.e. approximately 4 m in a fixed timeframe. The Rayleigh range may hereby refer to the distance from the waist of a beam along its path, from its waist to a cross-section twice its area, at which point the cross-sectional radius is approximately 1.414 ($\sqrt{2}$) of the waist radius.

In some examples, the mirrors have a size of 1 inch or approximately 1 inch, and/or the polarizing beam-splitters have a size of 1 inch or approximately 1 inch. In some examples, the two converging lenses have a focal length of 300 mm and a 2-inch size aperture. In examples in which a clear aperture needs to be increased, for example several polarizing beam-splitters may be stacked next to each other to achieve an effective larger aperture.

The electro-optic modulator (for example Pockels cell) can, in some examples, be switched from the OFF state to the ON state (and/or vice versa) in less than 10 ns. This may ensure that the switching time of the modulation is less than the standard 12.5 ns in 80 MHz repetition rate systems. In some examples, a driving switching voltage along the Pockels cell is approximately 1 kV.

Figure 2D:
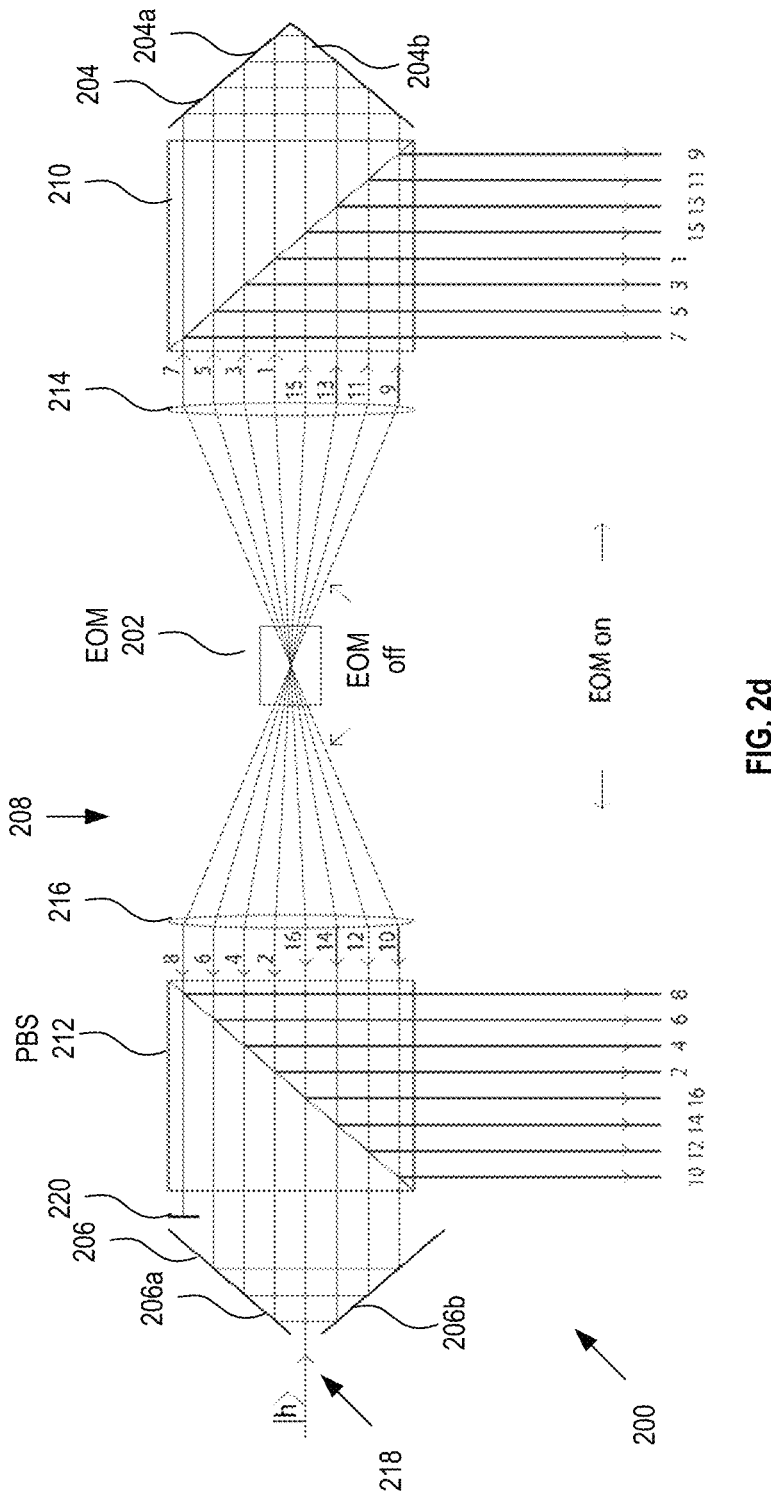
Figure 2E:
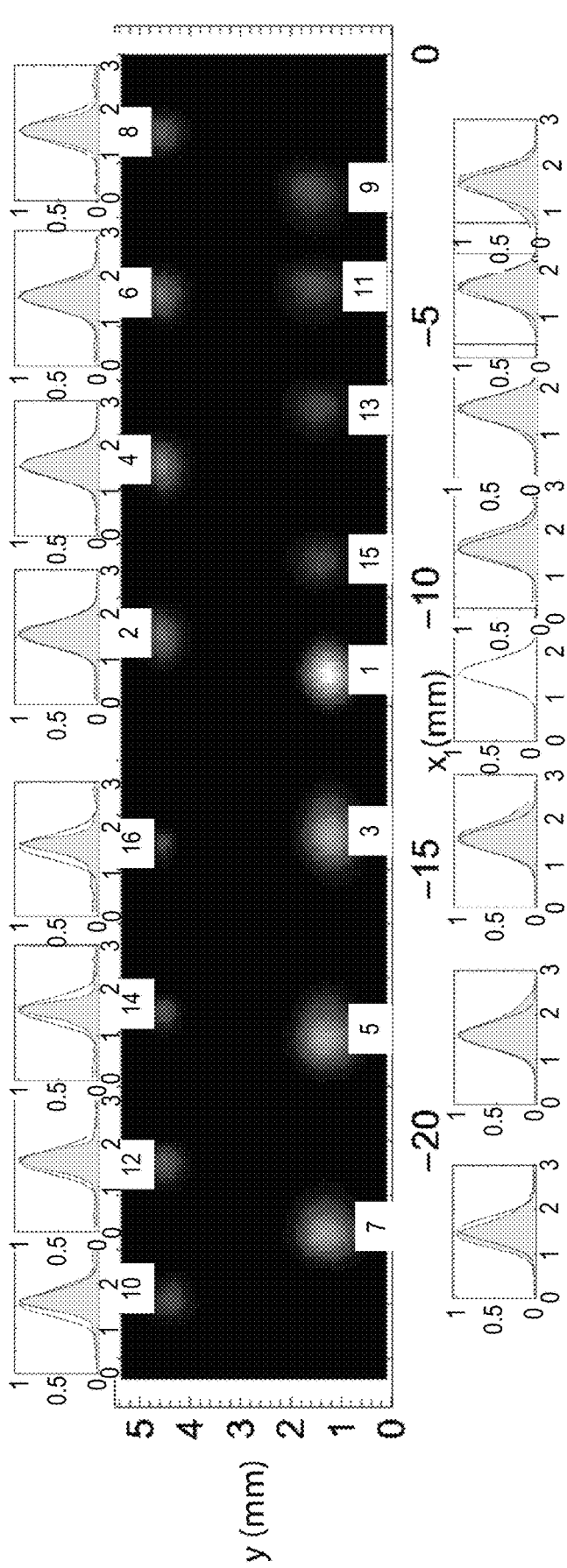
FIG. 2e shows spatial output distribution for the demultiplexer mode of FIG. 2d.

For testing the conceptual geometry of the demultiplexer, a smaller version, as in FIG. 2d, was built, using only standard 1-inch size optical elements, which resulted in 16 output spatial modes. The spatial mode of all 16 outputs is similar to the input mode, as can be seen in FIG. 2e, which may guarantee that they all can be collected with high fiber-coupling efficiency (i.e. allowing for high collection efficiencies in a single-mode fiber).

Among the parameters described above, the rise-time of the active element is the one directly impacting the system size. This is due to the travelling light pulses having to have their polarisation switched within the last round-trip of their trajectory, which means that the (time-equivalent) space of each round-trip should be smaller than the separation between pulses. Commercial state-of-the-art Pockels Cell can switch light polarisation with a switch time of approximately 10 ns. Hence, one can use standard laser/light systems with 80 MHz repetition rates (12.5 ns pulse separation).

Figure 3:
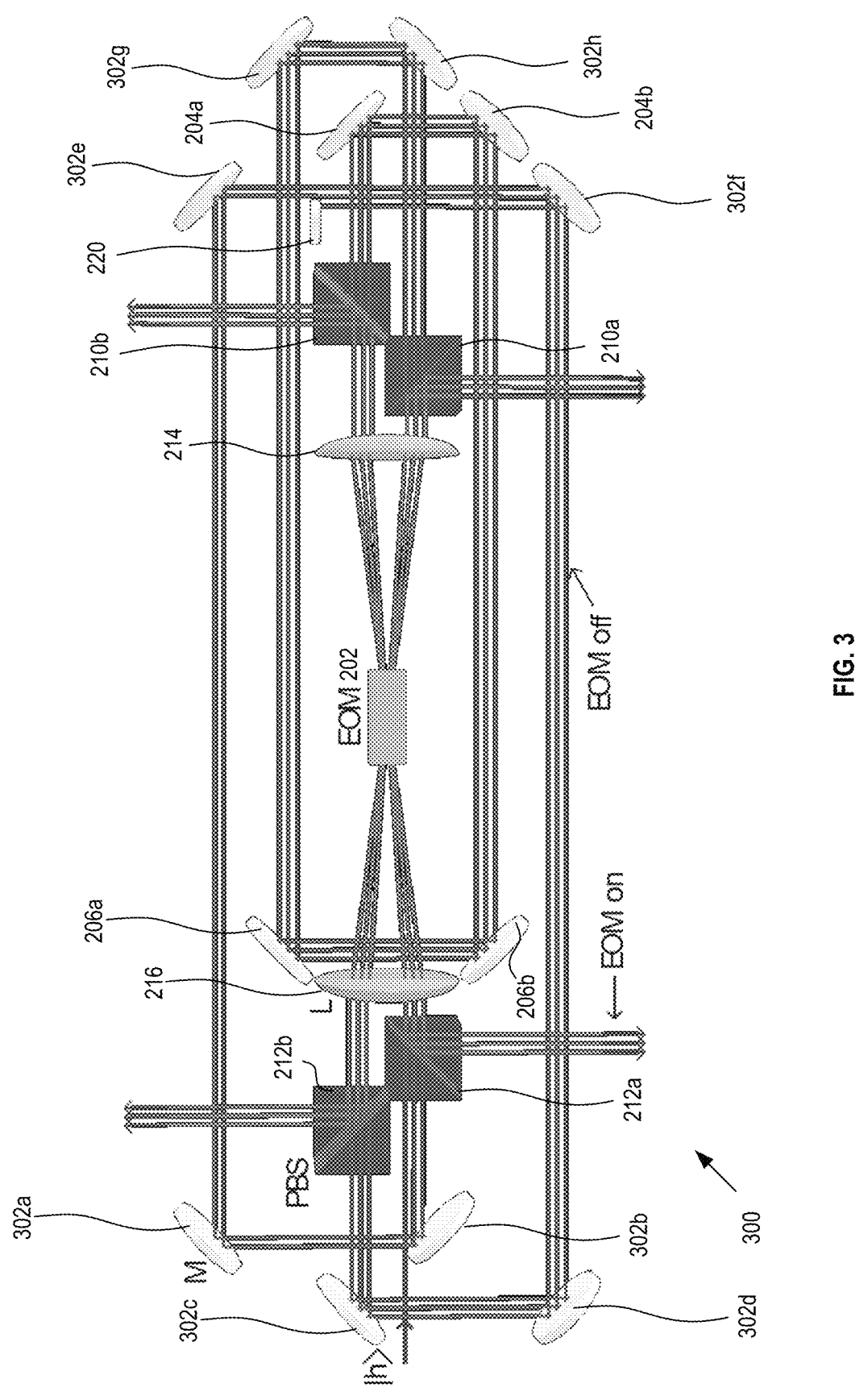
FIG. 3 shows a schematic illustration of a demultiplexer according to some example implementations of the present disclosure.

As will be appreciated, however, 12.5 ns in time is equivalent to 3.75 m in free-space for light pulses, resulting in an approximately 8 m long implementation following the alignment of FIG. 2d. In order to avoid this, additional mirrors 320a-h that do not change the conceptual working of the demultiplexer, but help reducing the footprint size, may be implemented, as shown in the demultiplexer 300 of FIG. 3. In some examples, the demultiplexer has a size of approximately 1.5 m times 0.5 m, in this example for a 12-output demultiplexer.

Figure 4:
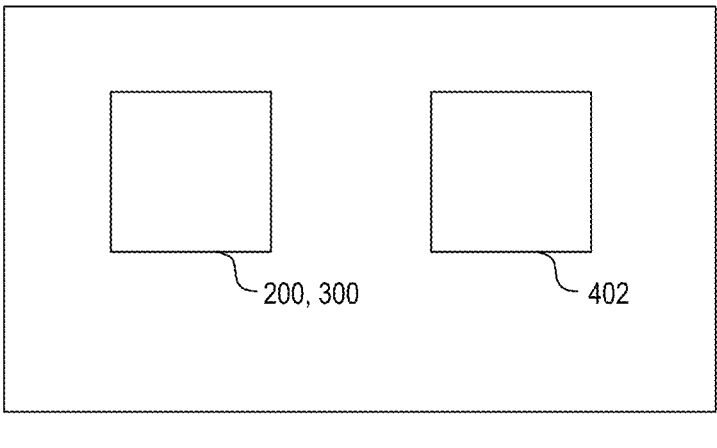
FIG. 4 shows a schematic block diagram of a system according to some example implementations of the present disclosure.

FIG. 4 shows a schematic block diagram of a system 400 according to some example implementations of the present disclosure.

In this example, the demultiplexer 200, 300 is comprised in the system 400 (which may be a quantum computing system) together with a single-photon source 402 for generating a stream of single-photons, wherein the single-photon source 402 is coupled to the optical demultiplexer 200, 300 for providing, by the single-photon source 402 to the optical demultiplexer 200, 300, the stream of single-photons. In this system 400, the demultiplexer 200, 300 is configured to output a plurality of indistinguishable single-photons onto corresponding, respective ones of different output trajectories.

FIG. 5 shows a flow chart of a method 500 according to some example implementations of the present disclosure.

The method 500 comprises, at step 502, providing a system, in particular a quantum computing system, comprising: an optical demultiplexer comprising: an electro-optic modulator configured to change, when the electro-optic modulator is in a first state, a polarization of light pulses having a first polarization and passing through the electro-optic modulator from the first polarization to a second polarization; a first mirror and a second mirror, wherein the electro-optic modulator is arranged in an optical trajectory between the first mirror and the second mirror for light pulses travelling in the optical trajectory between the first mirror and the second mirror to pass through the electro-optic modulator, wherein the first mirror and the second mirror are arranged in the optical demultiplexer such that light pulses travelling in the optical trajectory between the first mirror and the second mirror are displaced during each round of travelling forth and back between the first mirror and the second mirror; and a first polarizing beam-splitter arranged in the optical trajectory between the first mirror and the electro-optic modulator, wherein the first polarizing beam-splitter is configured to: transmit light pulses having the first polarization, and reflect light pulses having the second polarization to decouple the light pulses having the second polarization, based on the electro-optic modulator having switched the polarization of the light pulses from the first polarization to the second polarization, from the optical trajectory between the first mirror and the second mirror, wherein the first polarizing beam-splitter is configured to decouple the light pulses which are displaced with respect to each other from the optical trajectory between the first mirror and the second mirror onto different output trajectories; and a single-photon source for generating a stream of single-photons, wherein the single-photon source is coupled to the optical demultiplexer for providing, by the single-photon source to the optical demultiplexer, the stream of single-photons, and wherein the optical demultiplexer is configured to output a plurality of indistinguishable single-photons onto corresponding, respective ones of the different output trajectories.

At step 504, the method 500 comprises providing, aligned parallel to and displaced from a central axis of the optical trajectory between the first mirror and the second mirror, a plurality of light pulses having a first polarization into the optical trajectory between the first mirror and the second mirror via the single-photon source.

At step 506, the method 500 comprises switching the electro-optic modulator from a second state, in which a polarization of the light pulses having the first polarization is not changed upon the light pulses passing through the electro-optic modulator, into the first state for changing the polarization of the light pulses from the first polarization to a second polarization.

At step 508, the method 500 comprises outputting the plurality of single-photons onto corresponding, respective ones of different output trajectories based on the first polarizing beam-splitter reflecting the light pulses having the second polarization to remove the light pulses from the optical trajectory between the first mirror and the second mirror. The light pulses may be output onto the corresponding, respective output trajectories.

A beam transverse spatial width of the light pulses provided via the single-photon source may, in some examples, be 2 millimeters or approximately 2 millimeters.

Figure 6:
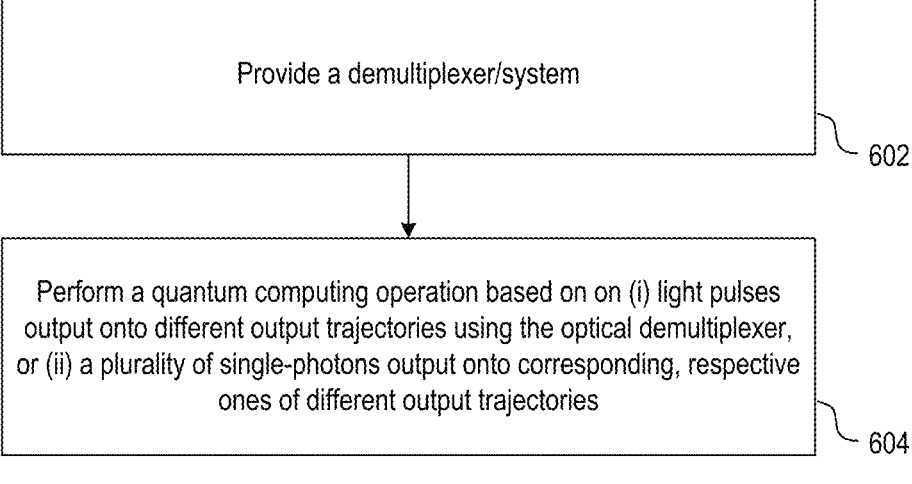
FIG. 6 shows a flow chart of a method according to some example implementations of the present disclosure.

FIG. 6 shows a flow chart of a method 600 according to some example implementations of the present disclosure.

At step 602, a demultiplexer or system according to any one of the example implementations as described herein is provided. At step 604, a quantum computing operation is performed based on (i) light pulses output onto different output trajectories using the optical demultiplexer according to any one of the example implementations as described herein, or (ii) a plurality of single-photons output onto corresponding, respective ones of different output trajectories using the system according to any one of the example implementations as described herein.

The module for time-space demultiplexing according to the present disclosure uses one single active element for routing an arbitrary number of time-modes within the same spatial mode onto different synchronised output spatial modes. A stream of light pulses, all in the same spatial mode, traversing the demultiplexer, is converted into various output trajectories, each simultaneously having one of such pulses.

The demultiplexer comprises, in some examples, three types of optical elements: one or more polarising beam-splitters to spatially sort orthogonal polarisations, highly-reflective mirrors (with a reflectivity of, e.g., more than 99.99%), and one (ultra-fast) electro-optic modulator, in particular in the form of a Pockels Cell, with run speeds of more than 10 MHz. Conceptually, the protocol is divided, as outlined above, in a "loading" stage and a "releasing" stage. In the former, input (laser) pulses travel through an increasingly growing and near-recurrent geometry while the electro-optic modulator (Pockels Cell) is maintained OFF. In the later stage, the electro-optic modulator (Pockels cell) is turned ON, which flips every pulse polarisation to an orthogonal state, now allowing them to be released from the recurrent geometry, and instead exit the device each in a different synchronised trajectory.

In the device according to the present disclosure, the number of active elements needed is reduced for demultiplexing N pulses, typically N−1 active elements in existing alternatives, down to a single active element. The number of modes that can be demultiplexed is conceptually arbitrary, limited in practice only by the finite aperture of the optical elements in use. With the approach presented herein, typically expensive high-voltage amplifiers and drivers, birefringent crystals, and complex multi-pulse electronics, are all reduced to one of each case, hence reducing price, footprint size, and ease of implementation. With an appropriate clear aperture, the demultiplexer according to example implementations as described herein may be configured to demultiplex tens of outputs while always occupying the same footprint size.

As outlined above, an important application of the demultiplexer is thus the building of multi-photon sources for optical quantum information processing, although other applications are possible, as will be appreciated by those with skill in the art. In this regard, quantum computing may be achieved by encoding the calculation process into a specific complex entangled state by manipulating and measuring the entangled state in a specific order, including quantum state adjustment. Measurement-based quantum computing is a resource state that is quantum computed based on a highly entangled cluster state. The calculation itself may be achieved by continuously measuring adjacent quantum bits from the cluster state. The order of measurements, together with the measuring device, may define a computer system for universal quantum computing by effectively implementing arbitrary single-quantum bit and two-quantum bit (or multi-quantum bit) operations.

No doubt many other effective alternatives will occur to the skilled person. It will be understood that the invention is not limited to the described embodiments and encompasses modifications apparent to those skilled in the art and lying within the scope of the claims appended hereto.

What is claimed is:

1. An optical demultiplexer, comprising:
an electro-optic modulator configured to change, when the electro-optic modulator is in a first state, a polarization of light pulses having a first polarization and passing through the electro-optic modulator from the first polarization to a second polarization;
a first mirror and a second mirror, wherein the electro-optic modulator is arranged in an optical trajectory between the first mirror and the second mirror for light pulses travelling in the optical trajectory between the first mirror and the second mirror to pass through the electro-optic modulator, wherein the first mirror and the second mirror are arranged in the optical demultiplexer such that the light pulses travelling in the optical trajectory between the first mirror and the second mirror are displaced perpendicular to a propagation direction of the light pulses between the first mirror and the second mirror during each round of travelling forth and back between the first mirror and the second mirror;
a third mirror arranged at an end of the optical trajectory at normal incidence with respect to the optical trajectory at an end portion of the optical trajectory for reflecting light pulses to travel in the opposite direction between the first mirror and the second mirror; and
a first polarizing beam-splitter arranged in the optical trajectory between the first mirror and the electro-optic modulator, wherein the first polarizing beam-splitter is configured to:
transmit light pulses having the first polarization, and
reflect light pulses having the second polarization to remove the light pulses having the second polarization from the optical trajectory between the first mirror and the second mirror, wherein the first polarizing beam-splitter is configured to reflect the light pulses which are displaced with respect to each other perpendicular to the propagation direction onto different, respective output trajectories.

2. An optical demultiplexer as claimed in claim 1, further comprising a second polarizing beam-splitter arranged in the optical trajectory between the second mirror and the electro-optic modulator, wherein the second polarizing beam-splitter is configured to:
transmit light pulses having the first polarization, and
reflect light pulses having the second polarization to remove the light pulses having the second polarization from the optical trajectory between the first mirror and the second mirror, wherein the second polarizing beam-splitter is configured to reflect the light pulses which are displaced with respect to each other perpendicular to the propagation direction onto different, respective output trajectories.

3. An optical demultiplexer as claimed in claim 1, further comprising a first converging lens arranged in the optical trajectory between the electro-optic modulator and the first polarizing beam-splitter, wherein the first converging lens is configured to converge light pulses travelling in the optical trajectory from the electro-optic modulator to the first converging lens for the light pulses which are displaced with respect to each other perpendicular to the propagation direction to travel parallel with respect to each other between the first converging lens and the first polarizing beam-splitter.

4. An optical demultiplexer as claimed in claim 3, further comprising a second converging lens arranged in the optical trajectory between the electro-optic modulator and the second mirror, wherein the second converging lens is configured to converge light pulses travelling in the optical trajectory from the electro-optic modulator to the second converging lens for the light pulses which are displaced with respect to each other perpendicular to the propagation direction to travel parallel with respect to each other between the second converging lens and the second mirror.

5. An optical demultiplexer as claimed in claim 2, further comprising a second converging lens arranged in the optical trajectory between the electro-optic modulator and the second polarizing beam-splitter, wherein the second converging lens is arranged in the optical trajectory between the electro-optic modulator and the second polarizing beam-splitter, wherein the second converging lens is configured to converge light pulses travelling in the optical trajectory from the electro-optic modulator to the second converging lens for the light pulses which are displaced with respect to each other perpendicular to the propagation direction to travel parallel with respect to each other between the second converging lens and the second polarizing beam-splitter.

6. An optical demultiplexer as claimed in claim 4, wherein the first converging lens and the second converging lens are arranged in the optical demultiplexer in a telescope configuration with unit magnification.

7. An optical demultiplexer as claimed in claim 6, wherein an input path into the optical demultiplexer for light pulses travelling in the optical trajectory between the first mirror and the second mirror is aligned parallel to and displaced from a central axis of the telescope configuration.

8. An optical demultiplexer as claimed in claim 6, wherein the electro-optic modulator is arranged in a center or center region of the telescope configuration.

9. An optical demultiplexer as claimed in claim 3, wherein the first mirror comprises a first mirror component and a second mirror component for reflecting light pulses travelling in the optical trajectory from the first converging lens to the first mirror, wherein the first mirror component and the second mirror component are aligned substantially perpendicular with respect to each other, and wherein the first mirror component and the second mirror component are aligned at an angle of substantially 45 degrees with respect to the optical trajectory on which the light pulses travel parallel with respect to each other between the first converging lens and the first mirror.

10. An optical demultiplexer as claimed in claim 4, wherein the second mirror comprises a third mirror component and a fourth mirror component for reflecting light pulses travelling in the optical trajectory from the second converging lens to the second mirror, wherein the third mirror component and the fourth mirror component are aligned substantially perpendicular with respect to each other, and wherein the third mirror component and the fourth mirror component are aligned at an angle of substantially 45 degrees with respect to the optical trajectory on which the light pulses travel parallel with respect to each other between the second converging lens and the second mirror.

11. An optical demultiplexer as claimed in claim 1, wherein one or both of the first mirror and the second mirror comprise an opening for light pulses to be provided into the optical trajectory between the first mirror and the second mirror.

12. An optical demultiplexer as claimed in claim 1, wherein the optical demultiplexer is configured to remove, via the first polarizing beam-splitter, light pulses having different temporal modes and a same spatial mode from the optical trajectory onto different spatial modes when switching the electro-optic modulator from a second state, in which the polarization of the light pulses having the first polarization is not changed upon the light pulses passing through the electro-optic modulator, into the first state.

13. An optical demultiplexer as claimed in claim 12, wherein, based on all light pulses travelling on the optical trajectory between the first mirror and the second mirror having the first polarization and upon the electro-optic modulator being switched from the second state into the first state for the polarization of all light pulses being changed from the first polarization to the second polarization when travelling through the electro-optic modulator in the first state, the first polarizing beam-splitter is configured to remove all light pulses simultaneously or within less than 10 nanoseconds from the optical trajectory between the first mirror and the second mirror.

14. An optical demultiplexer as claimed in claim 13, wherein, upon the electro-optic modulator being switched from the second state into the first state, the first polarizing beam-splitter is configured to remove all light pulses simultaneously or within less than 10 nanoseconds from the optical trajectory between the first mirror and the second mirror with each one of said output trajectories containing a single one of said light pulses.

15. An optical demultiplexer as claimed in claim 1, wherein the electro-optic modulator comprises a Pockels cell, and wherein the first state relates to a state in which the Pockels cell is turned on.

16. An optical demultiplexer as claimed in claim 1, wherein the electro-optic modulator is switchable between the first state, in which the polarization of the light pulses having the first polarization is changed upon the light pulses passing through the electro-optic modulator, and a second state, in which the polarization of the light pulses having the first polarization is not changed upon the light pulses passing through the electro-optic modulator, in less than 10 nanoseconds.

17. An optical demultiplexer as claimed in claim 1, further comprising a set of further mirrors arranged in the optical trajectory to confine the optical trajectory in an area having dimensions of 1.5 meters or less by 0.5 meters or less for an optical trajectory length of at least 6 meters.

18. A quantum computing system, comprising:
the optical demultiplexer as claimed in claim 1;
a single-photon source for generating a stream of single-photons, wherein the single-photon source is coupled to the optical demultiplexer for providing the stream of single-photons to the optical demultiplexer.

19. A method of outputting a plurality of single-photons onto corresponding, respective ones of different output trajectories, wherein the method comprises:
providing the system of claim 18;
providing, aligned parallel to and displaced from a central axis of the optical trajectory between the first mirror and the second mirror, a plurality of light pulses having a first polarization into the optical trajectory between the first mirror and the second mirror via the single-photon source,
switching the electro-optic modulator from a second state, in which a polarization of the light pulses having the first polarization is not changed upon the light pulses passing through the electro-optic modulator, into the first state for changing the polarization of the light pulses from the first polarization to a second polarization; and
outputting the plurality of single-photons onto corresponding, respective ones of different output trajectories based on the first polarizing beam-splitter reflecting the light pulses having the second polarization to remove the light pulses from the optical trajectory between the first mirror and the second mirror.

\* \* \* \* \*